United States Patent [19]
Leek et al.

[11] Patent Number: 5,603,580
[45] Date of Patent: Feb. 18, 1997

[54] POSITIVE ANGLE FASTENER DEVICE

[75] Inventors: William F. Leek, Anaheim; Alfred D. Commins, Danville, both of Calif.

[73] Assignee: Simpson Strong-Tie Company, Inc., Pleasanton, Calif.

[21] Appl. No.: 452,992

[22] Filed: May 30, 1995

[51] Int. Cl.$^6$ ............................................. B25G 3/00
[52] U.S. Cl. .................... 403/232.1; 403/168; 403/235; 403/237; 52/93.1; 52/702
[58] Field of Search ..................... 403/232.1, 168, 403/235, 233, 237, 306, 408.1, 407.1; 52/702, 712, 714, 92.2, 93.1

[56] References Cited

U.S. PATENT DOCUMENTS

| | | |
|---|---|---|
| 1,406,723 | 2/1922 | Caldwell . |
| 3,036,347 | 5/1962 | Findleton ................................... 20/94 |
| 3,147,484 | 9/1964 | Nelson .......................................... 1/47 |
| 3,345,029 | 10/1967 | Palmer .................... 248/300 |
| 3,752,512 | 8/1973 | Gilb ..................... 287/20.94 |
| 4,291,996 | 9/1981 | Gilb ............................................ 403/14 |
| 4,480,941 | 11/1984 | Gilb et al. .............................. 403/232.1 |
| 5,160,211 | 11/1992 | Gilb ......................................... 403/231 |
| 5,372,448 | 12/1994 | Gilb ......................................... 403/231 |
| 5,380,116 | 1/1995 | Colonias ................................. 403/231 |
| 5,419,649 | 5/1995 | Gilb ......................................... 403/231 |

OTHER PUBLICATIONS

Silver Teco 1994 Product Catalog p. 23.

*Primary Examiner*—Blair Johnson
*Assistant Examiner*—Bruce A. Lev
*Attorney, Agent, or Firm*—James R. Cypher

[57] ABSTRACT

A positive fastener-angling device for positioning an elongated fastener with respect to the face of a sheet metal connector and a wood member only at a preselected angle which is substantially less than 90° by forming a slit-cut in the sheet metal connector by means of a die which progressively at the same station, forms a fastener guideway in the shape of a half cone. The fastener opening and the guideway are dimensioned so that the fastener can only penetrate the sheet metal connector at a preselected angle set at the factory.

8 Claims, 4 Drawing Sheets

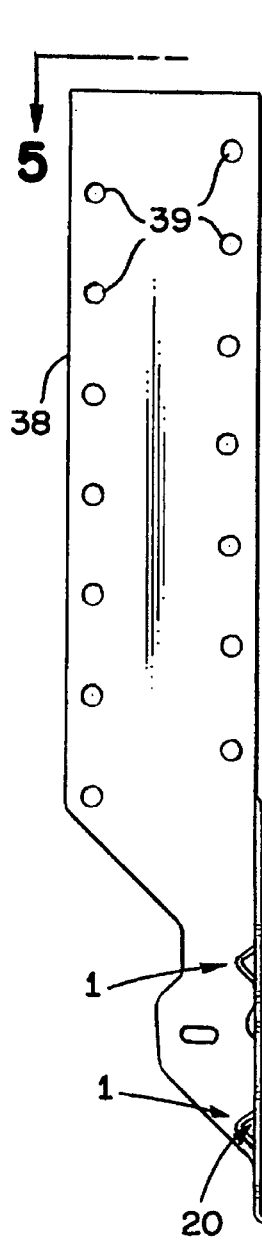
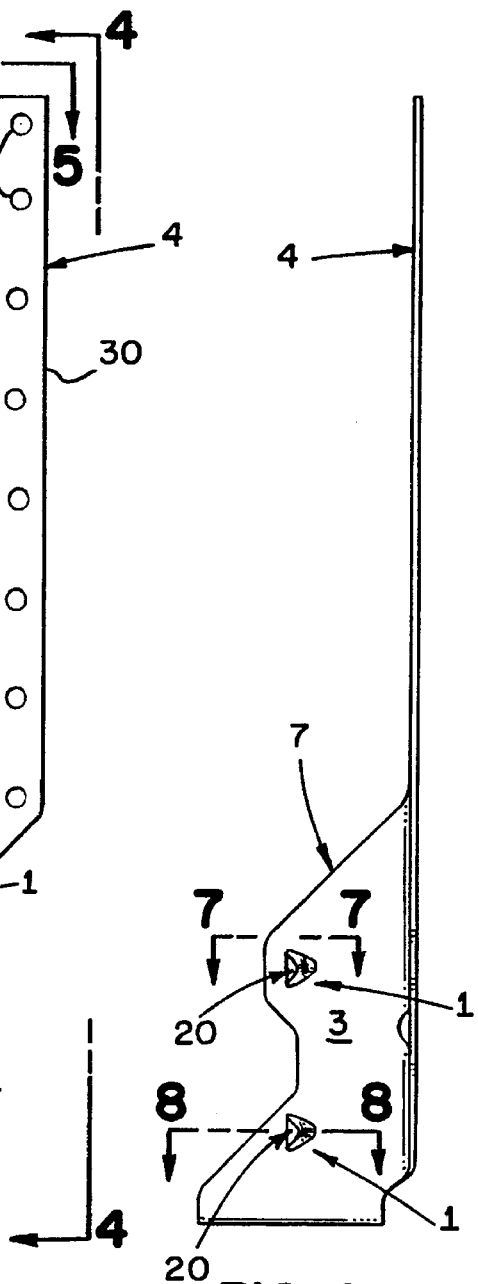
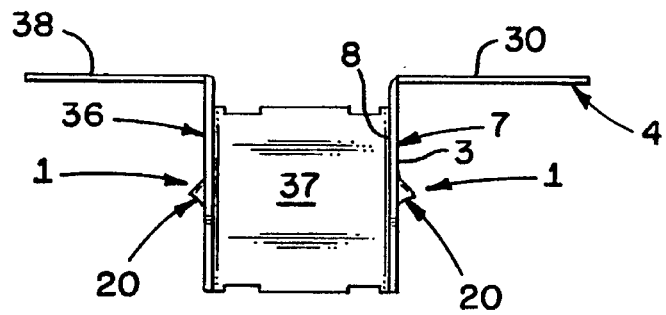
FIG. 3
FIG. 4
FIG. 5

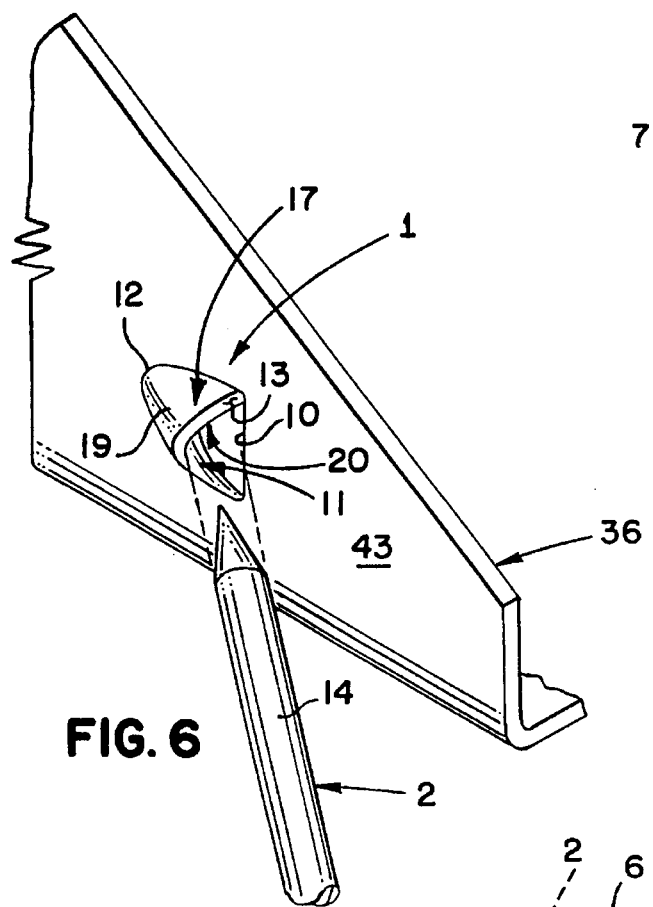
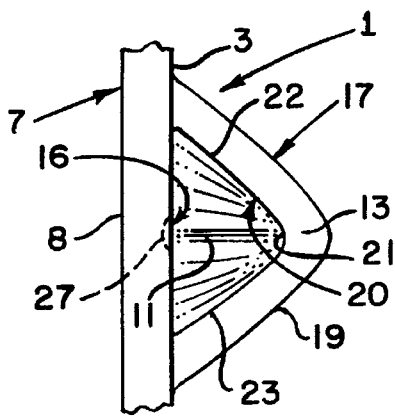
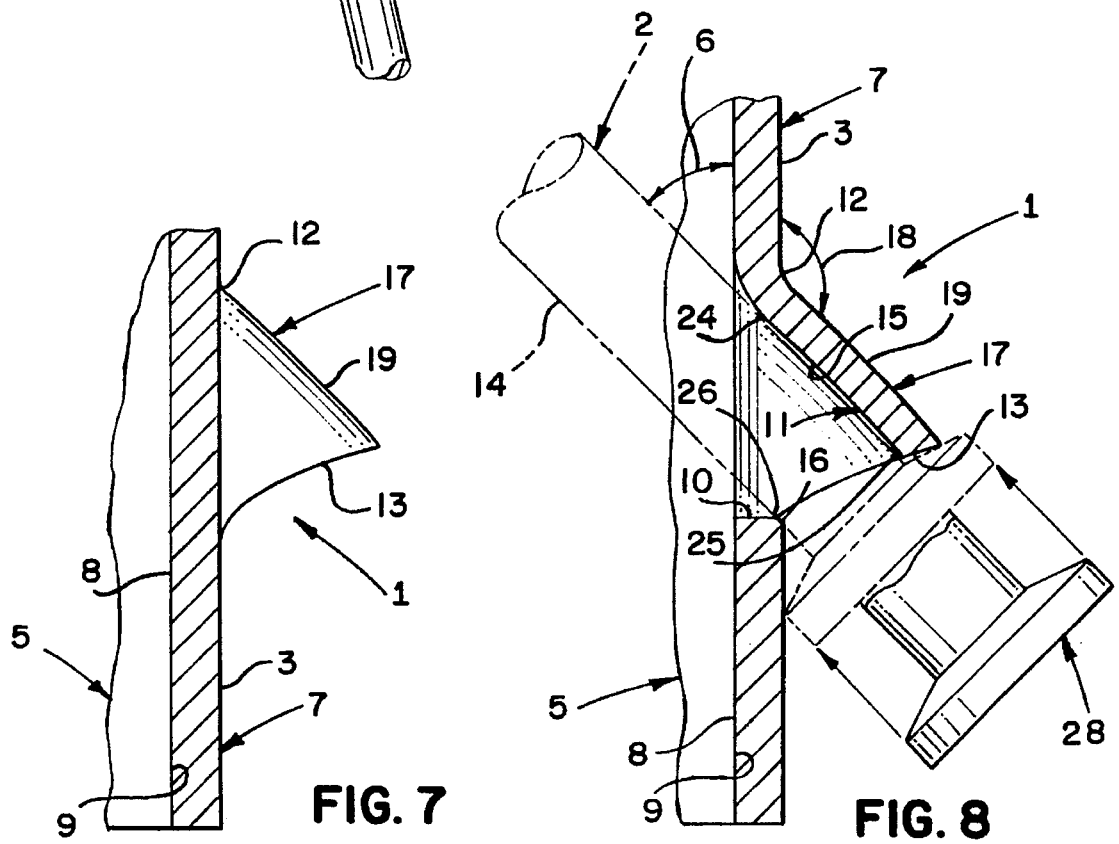

5,603,580

POSITIVE ANGLE FASTENER DEVICE

BACKGROUND OF THE INVENTION

The need for a positive angle fastener device for metal connectors used for connecting wood members exists in three separate areas; viz., (1) prevention of wood splitting due to wood shrinkage, (2) prevention of splitting of laminated wood members such as plywood glued laminated timbers (glulam and prefabricated wood joists (microlams), and (3) insertion of fasteners through a held member and a holding member which are joined by a special connector so that a plurality of fasteners will be in double shear.

The first two problem areas are fully discussed in Gilb U.S. Pat. No. 4,291,996 Sep. 29, 1981, and the third problem area is discussed in Gilb and Commins U.S. Pat. No. 4,480,941 granted Nov. 6, 1984.

Gilb U.S. Pat. No. 4,291,966, supra, taught the use of a slot-like opening in the face of the metal connector and then bending out a tab-like member formed from the displaced material. The Gilb tab-like device has been commercially very successful with thousands of hangers carrying the positive angle nailing device.

The Gilb tab-like device has several problems as set forth as follows: (1) the punching of a slot has a similar effect of punching a large opening in the metal which tends to weaken the metal; (2) the tab protruding from the metal tends to snag on other building materials prior to installation; (3) the protruding tab has invited installers who are not familiar with the purpose of the tab to forcibly bend the tab with a hammer or pair of pliers, thereby destroying the purpose of the tab; the tab is relatively easily bent during non-aligned hammering of the fastener during installation and (5) while the cost of forming the tab is minimal, yet it does require two stations; viz, a cutting station and a bending station thereby adding to the cost of manufacture.

SUMMARY OF THE INVENTION

The gist of the present invention is the use of a single die at a single work station which forms a slit in the metal and then forms a half cone-like shape for receiving and holding a fastener at a selected angle while it is being driven through the opening.

An object of the present invention is to form the smallest cut possible in the sheet metal to minimize the loss of strength of the connector.

Another object is to minimize the protrusion from the side of the material to minimize the possibility of the deformed opening snagging other materials.

Still another object is to render the device nearly immune to tampering by workmen who do not understand the reason for the device.

Another object is to reduce the cost of manufacturing the positive angle fastening device. A further object is to form a relatively unyielding guideway so that the nail can only be driven at the factory selected angle.

BRIEF DESCRIPTION OF THE DRAWINGS

FIG. 3 is a front elevation view of the connector illustrated in FIG. 1 and showing the positive angle fastener device.

FIG. 4 is a side elevation view of the connector illustrated in FIG. 3 taken in the general direction of line 4—4.

FIG. 5 is a top plan view of the connector illustrated in FIG. 3 taken generally along line 5—5.

FIG. 6 is an enlarged scale view of a portion of the connector shown in FIG. 1 taken generally in the vicinity of line 6-6 specifically illustrating the fastener guideway means. A portion of a fastener such as a nail is drawn prior to entry into the opening of the positive angle fastener device. A pair of parallel phantom lines are shown to indicate the path of the fastener prior to entry into the opening.

FIG. 7 is an enlarged scale partial cross sectional view of a portion of the connector illustrated in FIG. 4 taken generally along line 7-7.

FIG. 8 is an enlarged scale partial cross sectional view of a guideway means portion of the connector illustrated in FIG. 4 taken generally along line 8—8. A portion of a nail fastener is illustrated with the solid line portion indicating a position of the fastener just prior to seating, and a phantom line fastener illustrating the position of the fastener after being fully driven or seated.

FIG. 9 is an enlarged view of a guideway means portion of the connector illustrated in FIG. 3 taken in the vicinity of line 9—9.

FIG. 10 is a perspective view of the positive angle fastener device illustrated in FIGS. 1–9 in a connection where positive angle fastening is important to prevent splitting of the laminated portions of the bottom chord of the beam shown in phantom line.

FIG. 11 is a perspective view of a portion of the connector illustrated in FIG. 10 on an enlarged scale taken within the general area bounded by the curved line 11-11.

DESCRIPTION OF THE PREFERRED EMBODIMENTS OF THE INVENTION

Figure 1:
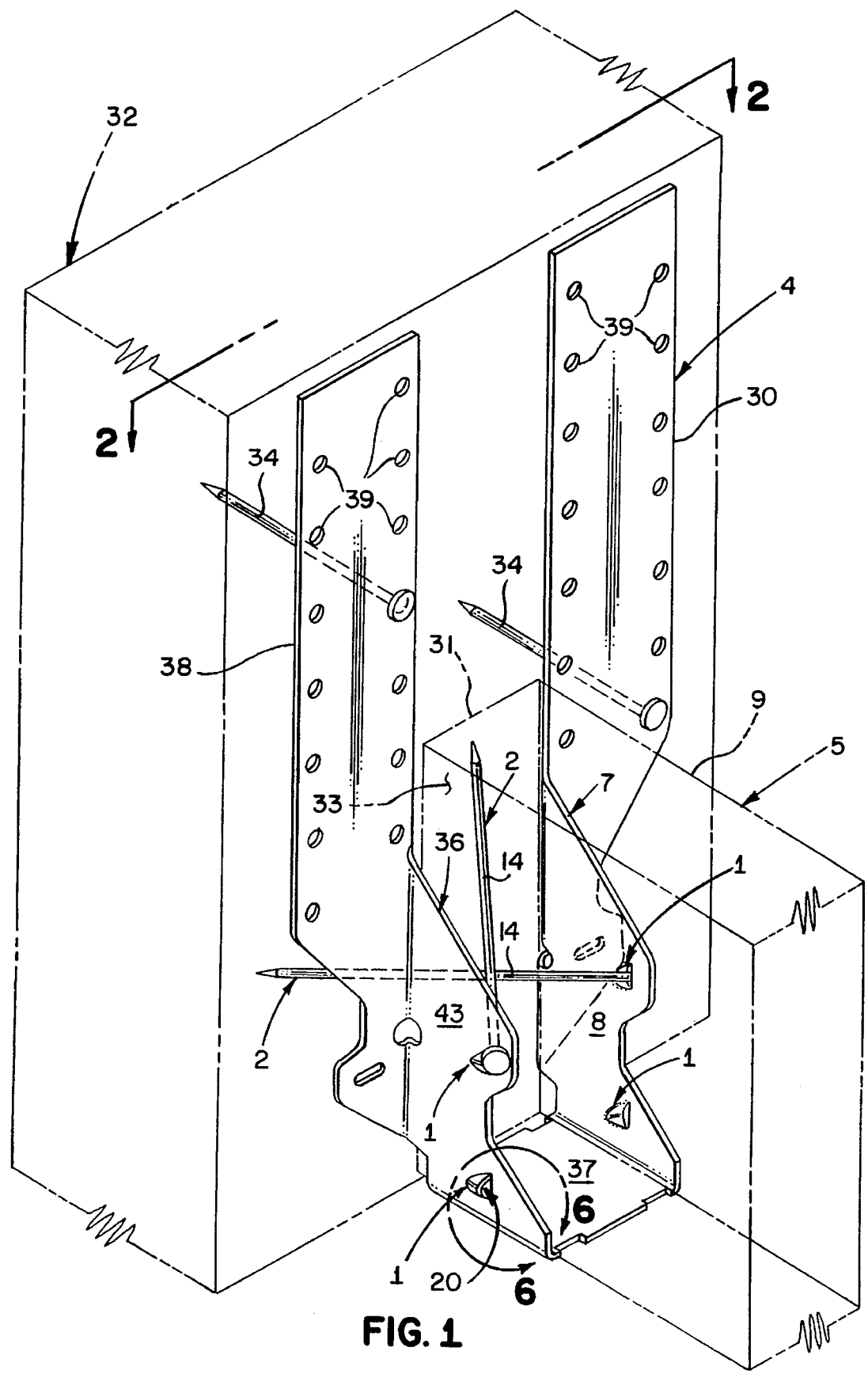
FIG. 1 is a perspective view of the positive angle fastener device of the present invention installed in a connector in which the connection places a plurality of the fasteners in double shear as that term is defined in U.S. Pat. No. 4,480,941. The held and holding members are in phantom line so that the placement of the fasteners may be better understood.
Figure 2:
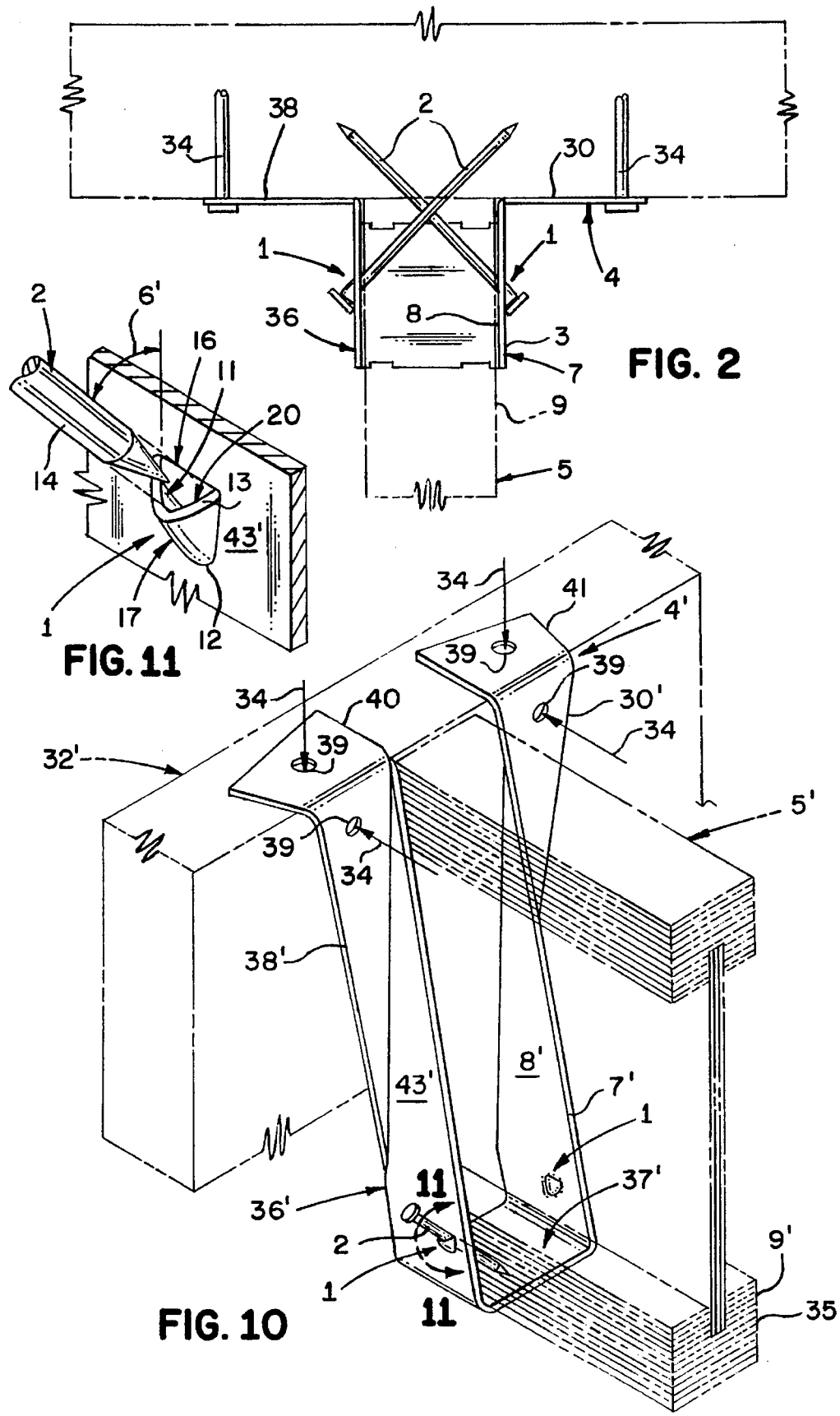
FIG. 2 is a top plan view of the connection illustrated in FIG. 1 taken in the direction of the line 2—2 of FIG. 1. The held and holding wood members are shown in phantom line so that the relationship of the fasteners to the sheet metal connector and the wood members may be more clearly understood.

Referring to FIGS. 1-9, the positive fastener-angling device 1 of the present invention for positioning an elongated fastener 2 with respect to the face 3 of a sheet metal connector 4 and a wood member 5 only at a preselected angle 6 which is substantially less than 90° includes: the sheet metal connector 4 is formed with a side member 7 having a generally planar side face portion 8 for close registration with a generally planar portion 9 of the wood member 5; the positive fastener-angling device 1 includes a slit-cut 10 (see FIGS. 6 and 8) in the side member 7 and a guideway means 11 formed from the deformed material of the side member 7 in the general shape of one half of a cone 17 having a curved wall 19, an apex 12 and a base 13 and forming an angle 18 with the face 3 of the side member 7; the slit-cut 10 and guideway means 11 form a fastener opening 20 for the receipt of the fastener 2; the elongated fastener 2 having a shank 14; a portion of which has a constant cross section; the guideway means 11 is formed with a wall 15 having a length and strength sufficient to unyieldingly hold the shank 14 of the fastener 2 in combination with the edge 16 of the slit-cut 10 (see FIG. 8) at the preselected angle 6 during the driving of the fastener 2 into the wood member 5.

The positive fastener-angling device 1, as best shown in FIGS. 9 and 6, is preferably constructed with the fastener opening 20 having the general shape of a triangle having an arcuate apex 21, two generally equilateral arcuate sides 22 and 23 and a generally straight base which is also edge 16 of slit cut 10; and the fastener opening 20 is dimensioned to receive the fastener 2 and is dimensioned generally equal to or slightly less than the diameter of the fastener shank portion 14.

In using the positive fastener-angling device, when the fastener 2 is inserted through the fastener opening 20, see FIG. 6 the shank 14 of the fastener 2 is engaged by the guideway means 11, see FIG. 8 at least at two longitudinally spaced points 24 and 25 and at least one point 26 on the edge 16 of the slit-cut 10 at a location radially spaced from the two longitudinally spaced points 24 and 25 on guideway walls 15 of the guideway means 11 and at a location longitudinally between the two longitudinally spaced points 24 and 25 on guideway wall 15 of the guideway 11. This geometry insures that the fastener 2 is firmly held and positively guided at three points during the entire fastener driving procedure.

Greater positive fastener guidance occurs in the positive fastener-angling device 1 upon insertion of a fastener 2 having a diameter greater than the fastener opening 20, since the driving of the fastener 2 forms a depression 27 (see FIG. 9) in the slit-cut edge 16. This change may be seen in FIG. 9 and by the rounding of slit cut edge 16 in FIG. 8.

Preferably, the positive fastener-angling device 1 is used with a fastener 2 which is formed with a head 28 having a dimension greater than said fastener opening 20 to prevent the fastener 2 from being driven completely through the guideway means 11 shown in FIGS. 6 and 8.

It is to be understood that in the positive fastener-angling device 1, the fastener 2 is generally understood to be a nail.

In another form of the device the positive fastener-angling device 1 may be used in combination with a fastener 2 which is a threaded screw. With the advent of the automatic hand held screw gun, the use of threaded screws used with sheet metal connectors is increasing.

The positive fastener-angling device 1 of the present invention is particularly useful in the type of connector 4 illustrated in FIGS. 1–9 wherein the metal connector 4 is a hanger having a side member 7, angularly attached to a header-side member 30; the wood member 5 is an elongated held member having an end 31; a wood holding member 32 is angularly disposed to the held member 5 and abutting the end 31 of the elongated held member 5; the fastener 2 is adapted for being driven through a portion 33 of the held member 5 and into the holding member 32 so as to place the fastener 2 in double shear; and a header fastener 34 connects the header side member 30 to the wood holding member 32. Double shear type connectors are fully illustrated and described in Gilb U.S. Pat. No. 4,480,941.

Another important use for the positive fastener-angling device 1 of the present invention is illustrated in FIGS. 10 and 11 wherein: the metal connector 4' is a hanger having a side member 7' angularly attached to a header-side member 30'; the wood member 5' is an elongated held member; a wood holding member 32' is angularly disposed to the held member 5'; and the guideway means 11 are formed in the generally planar side faces 8' and 43' of side members 7' and 36' so as to guide the fasteners 2 into the generally planar portion 9' of bottom chord 35 of elongated held member 5' at a preselected angle 6' to prevent splitting bottom chord 35 of the elongated held member 5'.

Specifically, the held member 5' illustrated in FIG. 10 is a microlam beam in which the bottom chord 35 is a laminated member. As more fully explained in Gilb U.S. Pat. No. 4,291,996, driving a fastener orthogonally would insert the nail parallel to the laminations and tend to split the bottom chord 35 whereas driving the fastener at an angle 6' as illustrated in FIG. 11 will not split the bottom chord 35.

As illustrated in the example hanger connector 4 shown in FIGS. 1–5, four separate positive fastener-angling devices 1 are used to attach held member 5 to holding member 32. It is to be understood that various numbers of positive fastener-angling devices 1 may be used in different hangers depending upon the design loads carried by the different hangers. The hanger shown in FIGS. 1–5 is only an example.

Completing the description of the hanger 4 illustrated in FIG. 1 which is partially described above, a second side member 36 is connected to the first side member 7 by a seat member 37. A second header side member 38 is connected to second side member 36 and is provided with a plurality of fastener openings 39 which consist of the standard punched round opening. Header fasteners such as header fastener 34 are driven through each fastener opening and into header 32.

The guideway means 11 in each of the positioner fastener-angling devices 1 are preset at a selected angle at the factory so that fasteners 2 will be driven through a portion 33 of the held member 5 and into the header 32 at about a 45° angle so that they will not intersect the other fasteners and contribute the splitting of the held member 5. The installer need only start the fastener at about a 45° angle and the guideway means 11 accurately place the fasteners 2 at the correct angle which is set at the factory. Thus an unskilled installer can accurately and properly install the hanger 4 without splitting the end portion 33 of held member 5.

It has been found that a single die member is capable of cutting the slit-cut 10 in side member 7 and forming the guideway means 11 in the form of one half a cone 17. It is to be understood that half cone 17 is not a perfect cone, but the word cone is use since it is the nearest geometric figure which describes the shape of the deformation in the side member 7. The slit-cut 10 and the half cone 17 are both done quickly at a single station thus contributing to the cost reduction in forming the position fastener-angling device as compared to the slot and tab member illustrated in Gilb U.S. Pat. No. 4,291,996.

Referring to FIGS. 10 and 11, the hanger 4', in addition to the previous description consists of a second side member 36' connected to the first side member 7' by a seat member 37'. A second header side member 38' is connected to second side member 36'. Top flanges 40 and 41 are connected to header side members 30' and 38'.

The hanger illustrated in FIGS. 10 and 11 is installed as follows: Fasteners indicated by arrows 34 are driven through fastener openings 39 in top flanges 40 and 41 and into openings 39 in header side members 38 and 30' into wood holding member 32'. Next, wood member 5' is installed with bottom chord 35 resting on seat 37'. Finally, fasteners 2' are inserted into fastener opening 20 as illustrated in FIG. 11. Fastener 2 need only be placed in fastener opening 20 at an approximately 45° angle, and the guideway means 11 immediately assumes control of fastener 2 and guides it at a selected angle 6' which has been set at the factory. It is to be noted that the positioner fastener-angling device 1 illustrated in FIGS. 10 and 11, is identical to the positioner fastener-angling device 1 illustrated in FIGS. 1–9, differing only in the orientation of the guideway means 11 which are oriented 90° to one another. Thus in FIGS. 10 and 11, the fastener 2 is driven downwardly at an angle which in the example is 45°. In FIGS. 1–9, in contrast, fasteners 2 are driven approximately horizontally and at an approximately 45° to the face 3 of side members 7 and 36.

Referring to FIGS. 1 and 6, it may be seen that positive fastener-angling device 1 is preferably formed in face 43 of second side member 36 as well as first side member 7. Like numbers have been used in describing the positive fastener-angling device 1 in second side member 36 and are not repeated.

We claim:

1. In a positive fastener-angling connection comprising:
   a. a wood holding member;
   b. a wood held member having a generally planar portion;
   c. a sheet metal connector attached to said wood held member and to said wood holding member;
   d. said sheet metal connector includes
      1.) a side member having a generally planar side face portion for close registration with said generally planar portion of said wood held member;
      2.) a generally straight line slit-cut in said generally planar side face portion of said side member having an edge;
      3.) guideway means die-formed in said side member in the general shape of one half of a cone having a curved wall, an apex and a base and said guideway means forming a pre-selected angle with said planar side face portion of said side member which is substantially less than 90°;
      4.) said generally straight line slit-cut and said guideway means form a fastener opening and guide;
   e. an elongated fastener having a shank, a portion of which has a constant cross section dimensioned for insertion through said generally straight line slit-cut and guideway means and into said wood held member;
   f. said guideway means in said side member of said sheet metal connector is formed with a wall having a length and strength sufficient to unyieldingly hold said shank of said fastener in combination with said edge of said generally straight line slit-cut at said preselected angle during the driving of said fastener into said wood held member;
   g. said fastener opening in said side member of said sheet metal connector has the general shape of a triangle having an arcuate apex, two generally equilateral arcuate sides and a generally straight base;
   h. said fastener opening is dimensioned to receive said fastener and is dimensioned generally equal to or slightly less than the diameter of said fastener shank portion;
   i. said fastener shank when inserted through said fastener opening is engaged by said wall of said guideway means at least at two longitudinally spaced points and at least one point on said edge of said generally straight line slit-cut at a location radially spaced from said two longitudinally spaced points on said guideway means and at a location longitudinally between said two longitudinally spaced points on said wall of said guideway means, and
   j. said shank of said fastener is held at said preselected angle of said guideway means only by said generally straight line slit-cut and said guideway means in said generally planar side face portion of said side member.

2. A positive fastener-angling connection as described in claim 1 wherein:
   a. upon insertion of a fastener having a diameter greater than said fastener opening, the driving of said fastener forms a depression in said edge of said generally straight line slit-cut.

3. A positive fastener-angling as described in claim 2 wherein:
   a. said fastener is formed with a head having a dimension greater than said fastener opening.

4. A positive fastener-angling connection as described in claim 2 wherein:
   a. said fastener is a nail.

5. A positive fastener-angling connection as described in claim 1 wherein:
   a. said fastener is a threaded screw.

6. A positive fastener-angling connection as described in claim 1 comprising:
   a. said metal connector is a hanger having a side member, angularly attached to a header-side member;
   b. said wood held member has an end;
   c. said wood holding member is angularly disposed to said wood held member and abuts said end of said wood held member;
   d. said fastener is adapted for being driven through said fastener opening in said side member, through a portion of said wood held member and into said wood holding member so as to place said fastener in double shear; and
   e. a header fastener connects said header side member to said wood holding member.

7. A positive fastener-angling connection as described in claim 1 comprising:
   a. said metal connector is a hanger having a side member angularly attached to a header-side member;
   b. said wood held member is formed with a bottom chord having a generally planar portion;
   c. said wood holding member is angularly disposed to said wood held member; and
   d. said guideway means is formed in said side member so as to guide said fastener into said bottom chord of said wood held member at a preselected angle to prevent splitting of said elongated held member.

8. A positive fastener-angling connection as described in claim 1 wherein:
   a. said preselected angle of said guideway means in said planar side face portion of said side member is in a plane generally between 30° and 60° with the plane of said planar side face portion of said side member.

\* \* \* \* \*

UNITED STATES PATENT AND TRADEMARK OFFICE
CERTIFICATE OF CORRECTION

PATENT NO. : 5,603,580
DATED     : 02-18-1997
INVENTOR(S) : William F. Leek

It is certified that error appears in the above-identified patent and that said Letters Patent is hereby corrected as shown below:

Column 4, line 59, after the words "side members" change 38 to ---38'---
Column 4, line 61, after the words "Finally, fasteners" change 2 to ---2---
Column 6, line 20, after the word "claim" change 2 to ---1---

Signed and Sealed this

Twenty-seventh Day of May, 1997

Attest:

BRUCE LEHMAN

Attesting Officer            Commissioner of Patents and Trademarks